April 28, 1953 H. G. GREIG 2,636,848

HIGH-SPEED ELECTROLYTIC MARKING

Filed July 19, 1948

INVENTOR
Harold G. Greig
BY Philip G. Cooper
ATTORNEY

Patented Apr. 28, 1953

2,636,848

UNITED STATES PATENT OFFICE 2,636,848

HIGH-SPEED ELECTROLYTIC MARKING

Harold Grey Greig, Princeton, N. J., assignor to Radio Corporation of America, a corporation of Delaware Application July 19, 1948, Serial No. 39,549

8 Claims. (Cl. 204—2)

This invention relates to electrolytic marking and more particularly to the production of marks at a high speed by passing an electrolytic current through a diminutive localized surface area of a suitably sensitized record member by means of two electrodes, to form the desired mark where this surface area contacts one of the electrodes, and arranging for the diminutive current carrying area to rapidly trace a desired path along the record member while suitably varying the current to produce any desired gradations of marks.

In the development of the electrolytic marking art, there has arisen a demand for increased marking speed. Where for example an image or raster is reproduced by scanning an original, generating a signal sequence of electrical pulses corresponding to the intensity of reflection from a sequence of localized spots of diminutive area and reproducing the image markings by similarly scanning a sensitized record member with a corresponding electrolytic current, as in facsimile reproducing, it is desired to reproduce the image in as short a time as possible. At the same time the reproduction should have sufficient resolution and detail to be clearly identifiable and readable. For satisfactory resolution of pictures and relatively fine type, the image may be scanned along parallel lines about 120 to the inch with a scanning spot about 0.0001 square inch in area. To reproduce a copy page occupying a rectangular area 7½ inches by 10 inches in edge dimension at a rate of even one page per minute, the scanning spot must move at least about 150 inches per second. At such speed the time available for an electrolytic marking reaction at any one spot is less than 0.0001 second.

Among the objects of this invention is the provision of novel electrolytic marking methods suitable for use at speeds as high as 150 linear inches per second and higher.

Further objects of the invention include novel high speed electrolytic marking methods that produce marked copies in which the marks and the background are relatively stable to storage and light.

Other objects of the invention include novel electrolytic marking methods in which a porous record member is moistened with an electrically conductive aqueous solution having at least one acid-stabilized diazonium compound, at least one azo coupler compound, and buffer material keeping the acidity of the solution within a controlled range so that cathodic electrolytic action temporarily renders the solution locally alkaline and causes the desired coupling of diazonium compound and coupler compound to form dye marks corresponding to the intensity of the electrolytic action, and premature coupling without electrolytic action does not take place.

A still further object of the invention is the provision of electrolytically marked images on a record member which is not likely to be irritating to the skin on contact.

Another object of the invention is novel sensitizing solutions and sensitized record members for high speed electrolytic marking.

Still another object of the invention are novel dry mixes for sensitizing record members for high speed electrolytic marking.

The above as well as other objects of the invention will be more completely understood from the following description of exemplifications thereof, reference being made to the accompanying drawings wherein.

Figure 1:
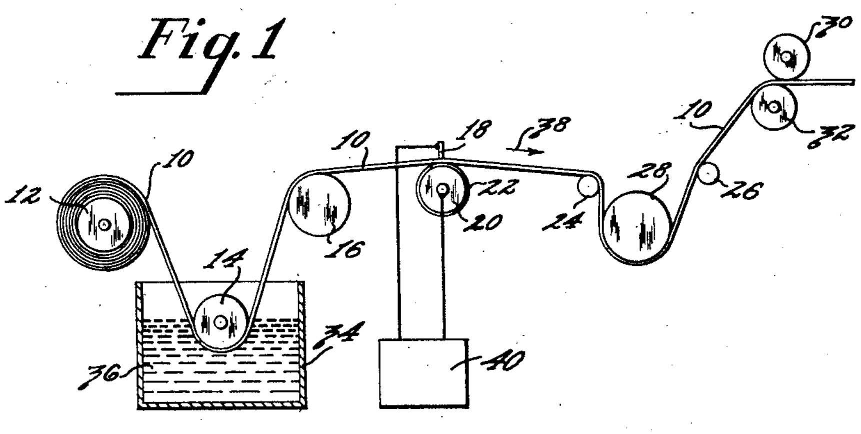
Fig. 1 is a diagrammatic side view showing the essential elements of one form of apparatus with which the method of the invention may be practiced.

According to the invention, electrolytic marking may be effected with scanning speeds as high as 600 or more linear inches per second by electrolytically controlling the coupling on a porous record member carrying an electrolytically conductive solution of at least one acid-stabilized diazonium compound with at least one azo coupler compound in the presence of buffer material that holds the overall acidity of the solution within the pH range from about 4.5 to about 5.5. The dye formed by the coupling adheres to the record member and the uncoupled diazonium compound may be deactivated or destroyed to prevent later undesired coupling on standing. By utilizing a diazonium compound that is decomposable by actinic radiation, the deactivation is easily accomplished by mere exposure of the marked record member to such radiation. This deactivation destroys any remaining diazonium compounds by converting them to corresponding phenolic or hydrogen-substituted materials that are uncolored or only slightly colored and are no longer capable of forming dye marks. The electrolytically formed marks, which develop by reason of the temporary local shift of the solution to the alkaline side due to cathodic removal of hydrogen ions, stand out clearly against the background. By the expression "acid-stabilized diazonium compound" is meant a diazonium compound which is kept from undergoing the normal decomposition of diazonium compounds by the presence of acids such as free acids i. e. tartaric, citric or boric acid, or salts having an acid reaction. Zinc chloride is an example of a stabilizing salt having an acid reaction.

The buffer material is an essential ingredient of the sensitizing solution of the invention. Without it the solution, which must be kept acid to prevent premature and undesired coupling, is incapable of satisfactory marking at the high marking speeds of the invention. The marks produced with prior-art solutions stabilized by acid do not have the full intensity development apparently because the alkaline shift at the cathode is too temporary. Also the mark produced is not of optimum color in the prior-art acid-stabilized range, apparently because its color is pH-sensitive in a manner similar to pH indicators and the relatively high ambient acidity heretofore used to stabilize such diazonium compounds keeps it on the acid side of the critical range where the color is not as dark as in the more alkaline regions.

Where the acidity of the unbuffered sensitizing solution is lowered to develop better color formation, it becomes quite sensitive to heat and has a very short useful life even at room temperature. This is especially pronounced when the unbuffered solution is used at a pH within the preferred buffer range. In many applications of the electrolytic marking technique, heat is used to adjust the water content of the sensitized record member to the critical range providing the best degree of marking and the weakly acidified solution may produce undesirable premature marks under the influence of the heating. Furthermore the life of the solution becomes so short, a matter of an hour or less, that ageing causes rapid changes and the mark formation characteristics are continually drifting necessitating constant adjustment of the controls. This condition becomes so severe as to often require adjustment after the facsimile reproduction of a single 8 inch by 10 inch page. A sensitizing solution of such a short useful life is awkward and expensive to use.

A feature of the invention is the presence of buffering material in the sensitizing solution to keep its acidity within a critical range. The more acid limit of the range corresponds approximately to the lowest pH at which the color of the mark produced by the dye formation is still the more intense color on the alkaline side of its pH responsive color change. This limit also corresponds generally to the point at which the solution and the record member containing the solution or the dried solute begins to become irritating to the skin when handled.

The more alkaline limit of the buffered range is that at which the solution life is long enough to provide adequate utility. For most purposes this life period may be eight hours, although for special applications, shorter periods may be tolerated.

This critical range expressed in pH units is from about pH 4.5 to about pH 5.5. Anywhere in this range satisfactory electrolytic marking can be effected at scanning speeds as high as 650 linear inches per second with very good resolution using 120 or more scanning lines per inch.

An example of a sensitizing solution of the invention is:

| Ingredient | concentration in mols per liter of solvent |
|---|---|
| Double chloride of zinc and diazotized p-aminodiethylaniline | 0.02 |
| Phloroglucinol | 0.006 |
| Resorcinol | 0.003 |
| Sodium chloride | 0.7 |
| Primary sodium phosphate ($NaH_2PO_4$) | 0.04 |
| Water | solvent |

The acidity of this solution is within the critical pH range and remains so even when applied to sensitive record members such as paper which generally contain adherent materials that have a tendency to alter the pH.

The double chloride may be conveniently prepared by any suitable well-known method as, for example, precipitation from a concentrated acid diazotizing solution by addition of zinc chloride. The remaining ingredients are standard commercially available chemicals.

The chemical reaction that produces the desired marking is as follows:

$$Ar_1{-}N{=}N(Cl) + HAr_2OH \longrightarrow Ar_1{-}N{=}N{-}Ar_2{-}OH + HCl$$

Where $Ar_1$ represents an aromatic radical having one free linkage.

In the above example it is

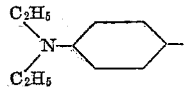

and $Ar_2$ represents an aromatic radical having two free linkages.

It is

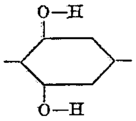

for phloroglucinol in the above example and

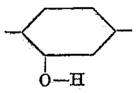

for resorcinol.

The formulae on the left hand side of the equation are sensitizing ingredients that react and couple in the manner shown only when the medium in which they are dissolved, is alkaline. Acidity of the medium prevents the coupling reaction indicated by the equation. The diazonium compound which is the first reactant shown has a light yellow color; the azo coupler compound (phloroglucinol and/or resorcinol in the example) are practically colorless. The first product ($AR_1{-}N{=}N{-}Ar_2{-}OH$) is an azo dye having a very strong dark color. The formula for this dye as given above is only a symbolic and simplified representation of the actual reaction product inasmuch as the diazonium compound may couple to more than one place on the aromatic ring of the azo coupler compound and may become simultaneously coupled in a plurality of positions to produce dyes having two or more parts of diazo structure (—N=N—) to one part of azo coupler. In the above example the dye produced is a mixture of coupled diazo-phloroglucinol and coupled diazo-resorcinol and has a deep purple-black color contrasting strongly with the background.

The electrolytic marking of the invention is practiced by moistening a porous record sheet member, such as a sheet of paper, textile or the like, with the sensitizing solution, and passing direct current through the moistened sheet between electrodes at least the cathode of which contacts the sheet and is moved along the portions to be marked. The term sheet member, as used herein, includes members in the form of a sheet, web, film or band. The current may also be controlled for modulating or varying the intensity of the marks as desired. At the negative electrode or cathode, the electric current causes discharge or removal of positively charged ions and inasmuch as the ever-present acidity controlling hydrogen ions (H+) are most readily discharged to liberate free hydrogen, the hydrogen ion concentration, which is a measure of the acidity of the solution, is lowered at this electrode. The decreased acidity permits coupling of the sensitizing reactants and dye formation takes place. Buffer action is also taking place at the same time and tends to lower the hydroxyl ion (OH) concentration and to return the acidity from the electrolytically induced alkaline range to the previous pH range. As is well-known, the hydrogen ion and hydroxyl ion concentrations in the solvent must always be related in such manner that their product is substantially constant. Accordingly a decrease of hydroxyl ion concentration inherently produces an increase in hydrogen ion concentration and vice versa.

In the sensitizing solution of the example the buffering action can be represented as:

$$H_2P\bar{O}_4 + \bar{O}H \rightleftarrows HP\bar{O}_4 + H_2O$$

The $H_2PO_4^-$ and $HPO_4^=$ ions do not affect the acidity much one way or the other so long as some excess $H_2PO_4^-$ ions remain unreacted. The tying up and effective removal of the hydroxyl ions shifts the pH in the acid direction. The presence of zinc salts appears to improve the buffering action and enables the use of lesser quantities of other buffering materials. The other ingredients of the solution do not appreciably affect the buffering operation.

The effect of the buffer is to help in restricting the electrolytic mark development to those regions of the record member immediately adjacent the cathode thereby preventing the spread of the locally generated alkalinity and increasing the definition and resolution of the marks.

Where the positive or anode electrode used for passing the electrolytic marking current is also in contact with the sensitizing solution, it tends to cause discharge or removal of the negatively charged hydroxyl ions thereby locally increasing the acidity. This also tends to reduce spreading of the marks.

The water content of the moistened record member must be adjusted within a critical range, if satisfactory marking results are to be produced. About 10 to about 60 percent water content by weight, based on the weight of the unmoistened record member can be used but 25 to 30 percent by weight is best.

Another feature of the invention is the ability to deactivate the sensitizing ingredients so that no marks can be formed after the desired electrolytic marking is completed. Thus the diazonium compound, as in the example above, may be decomposable by actinic radiation and/or elevated temperatures or other reagent. Decomposition by actinic light is especially suitable since it does not subject the record member to undue influences and can be very simply effected. The marked record member is merely exposed to a suitable source of such radiation, an ultra-violet lamp for example, for the time necessary to substantially completely decompose the diazonium compound. The decomposition proceeds at least in part as follows:

$$Ar_1{-}\underset{\displaystyle Cl}{\underset{|}{N}}{\equiv}N + H_2O \longrightarrow Ar_1{-}OH + HCl + N_2$$

leaving products even less colored than the undecomposed compound and incapable of further dye formation.

A further feature of the invention is the fact that the buffered mixture retained on the record member does not have sufficient acidity to be irritating to the skin. Thus after the marking operation is completed, the remaining chemicals need not be washed out of the record member which may be handled without gloves and with perfect safety.

Figures 2, 3:
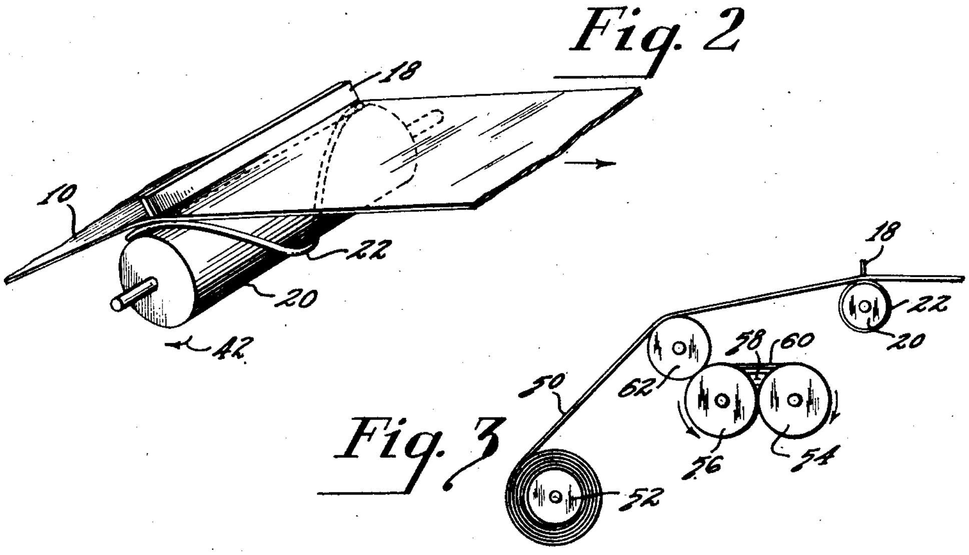
Fig. 2 is a diagrammatic perspective detail view of the electrolytic portion of the apparatus of Fig. 1.
Fig. 3 is a view similar to a portion of Fig. 1, of a modification of electrolytic marking apparatus with which the invention may be practiced.

Figs. 1 and 2 are diagrammatic views of one form of electrolytic marking apparatus with which the invention may be practiced. A fibrous record member such as paper 10 in elongated form and wound on a roll 12 is threaded under an immersion roller 14, over a heater 16 and between an electrically conductive bar 18 and a rotatable drum 20 carrying a radially projecting electrically conductive helix 22. From there the sheet may also be threaded over additional guides 24, 26 so as to be exposed to an actinic radiation emitter 28 and finally brought through a sheet impelling arrangement shown as a pair of pinch driving rolls 30, 32. The immersion roller 14 guides the sheet through a trough 34 in which is contained a sensitizing solution 36 for assuring that the sheet is properly moistened with the solution as it is moved along the threaded guide path by the impelling rolls 30, 32 in the direction of the arrow 38. The heater 16 is arranged to cause evaporation of a sufficient amount of solvent to bring the water content of the moistened sheet within the critical range indicated above.

The bar and helix conductors 18, 22 more clearly shown in Fig. 2, are connected to a source of marking current indicated at 40 and form the electrolytic marking electrodes. Guides 24, 26 may also be heated for drying the marked sheet or a separate dryer (not shown) may be provided. Emitter 28 may be a conventional ultra-violet light source in tubular form. Some or all of the guide structures 14, 16, 24, 26 and 28 may be rotatably mounted to move with the sheet and the rotatable ones may if desired, be interconnected with the impelling rolls 30, 32 for assisting in the uniform movement of the sheet.

Bar electrode 18 is fixed in position for contacting one face of the moving sheet while the helix-carrying drum 20 is arranged for rotation in the direction of the arrow 42 for example, and holding a portion of the helix against the opposite face of the moving sheet.

In the form shown in Fig. 2, the helix 22 extends approximately one turn around the drum 20 so that one small portion of the helix is presented opposite the bar 18 on both sides of an elemental portion of the sheet 10. This elemental sheet portion corresponds to a diminutive electrolytic cell having the bar 18 and helix 22 as its electrodes. It is here that electrolytic marking of the invention is effected at the electrode which is the cathode and in accordance with the intensity of the electrolytic current.

As the helix rotates, however, the elemental marking area moves transversely across the width of the sheet. By adjusting the rotation of the helix with respect to the advancement of the sheet, the marking area may be arranged to scan the sheet in any desired manner. Thus, if the drum 20 is interconnected with the pinch rolls 30, 32 so that the drum makes 120 revolutions each time the sheet is advanced one inch, the sheet is scanned transversely 120 scanning lines per inch. If the marking current supplied to the electrodes is also suitably modulated in accordance with a desired raster, as in the facsimile recording art, the electrolytic marks will reproduce that raster.

Fig. 3 is modified form of the apparatus of Fig. 1 in which a separate sensitizing solution is not needed. According to this form of the invention a roll of fibrous record material such as paper 10 wound on roller 52 carries a dried coating of at least the acid-stabilized diazonium compound and is passed between a moistening roll combination including pool-maintaining rolls 54, 56 which are arranged to revolve in contact with each other in the directions indicated by the arrows and keep a pool of moistening liquid 58 supported between their moving surfaces which define the side walls of a trough. The pool is confined at its ends by a pair of end walls, one being shown at 60, which are held in substantially liquid sealing relation against the curved peripheries of the cooperating rolls 54, 56. A transfer roll 62 which contacts the record sheet as well as one of the pool forming rolls picks up liquid from the contacted roll and applies it to the sheet to uniformly wet it along its width.

By adjusting the rate of rotation of the moistening rolls, as well as the depth of the pool 58, the amount of liquid deposited per unit length of record sheet is accurately controllable. For proper adjustment the deposited liquid should bring the water content of the sheet to within the critical range and should not wash away the sensitizing compounds, which are quite soluble. The coating on the pre-coated sheet 50 may for example be essentially on one face of the sheet and the moistening application be from the other face.

The liquid pool 58 contains all the sensitizing ingredients not pre-coated on the sheet. The coating may include all the sensitizing ingredients except for the water solvent in which case the liquid 58 need only be water. Where the sheet does not rapidly absorb the moistening liquid, a small amount of wetting agent may be incorporated in either the sheet or the liquid to facilitate the moistening.

The sensitizing formulation of the above example is subject to wide variation in accordance with the invention. The diazonium compound concentration may be varied between about 0.01 and 0.4 mol percent, the phloroglucinol between about 0.002 and 0.2 mol percent, the resorcinol between about 0.001 and 0.1 mol percent. Either of the azo coupler compounds may be omitted, if a black-like color is not desired. The concentration of the conductivity-improving electrolyte may be any value that permits carrying of the electrolytic marking current.

With effective electrode areas of 0.001 inch as provided by the apparatus of Figs. 1 or 3, very good marking is produced by electrolytic currents of from about 10 to about 200 milliamperes. Smaller currents are not very effective except at decreased marking speeds. Larger currents except at the highest speeds tend to cause any dyes produced to undergo further changes giving them a brunt and off-color appearance. The interelectrode voltage depends on the resistivity of the record sheet and is merely controlled to pass the desired current.

The buffer concentration should be sufficient to give the sensitizing solution a useful life of the order of eight hours. It has been discovered that with such a sensitization, electrolytic marking can be effected at speeds as high as 600 or more linear inches of record member per second. This means that facsimile raster 7½ by 10 inches in size and having 120 scanning lines per inch can be accurately marked in times as low as 15 seconds or less. Of course where less resolution is needed and fewer scanning lines are accordingly used, the marking is proportionally faster.

In place of the specific diazonium compound specified above, other stabilized forms of diazotized p-aminodiethylaniline may be substituted. Thus the double zinc halide or the double cadmium halide are essentially interchangeable. The double tin halide also provides good marking properties but causes some background discoloration. The fluoborate salt of the diazonium compound is very effective. Other diazotization products preferably of compounds of the class of p-phenylenediamines function similarly to the diazotized p-aminodiethylaniline and are suitable for the invention, either individually or in mixtures with it or with each other. Some of them are:

3-methyl-,4-aminodiethylaniline
p-aminodimethylaniline
p-phenylenediamine
4-aminodiphenylamine
2-amino-5-diethylaminotoluene
2, 5-diaminoanisole
4-amino-benzylethylaniline In place of part or all of aromatic hydroxy compounds the individual or combined azo couplers, other couplers preferably of the class of i. e. phenols and naphthols may be employed. Examples of such couplers are orcinol, pyrogallol, 8-hydroxyquinoline, 1-amino,-8-naphthol-2,4-disulfonic acid.

The conductivity improving electrolyte may be any other highly ionizable compound such as a salt of an alkali- or alkaline earth metal with a strong acid, as for example a halogen acid, sulfuric or nitric acid.

The buffer material is also of non-critical formulation. Especially suitable types of compounds that by themselves provide the desired buffer action are the acid salts of strong bases and relatively weak polybasic acids. Potassium acid tartrate ($KHC_4H_4O_6$), maleate ($KHC_4H_2O_4$), succinate ($KHC_4H_4O_4$), or the corresponding sodium salts are examples of this type. Mixtures of weakly acidic materials with compatible mildly alkaline materials such as the commercial buffers are also highly satisfactory. An example of such a composition is a mixture of citric acid and disodium phosphate ($Na_2HPO_4$) in proportion to exhibit the proper pH. A mixture of about twice as much of the disodium phosphate as the citric acid, in mol percent, has the desired buffering properties.

Where the sensitizing solution is separately prepared for moistening the record sheet, as when the invention is practiced with the apparatus of Fig. 1, the relatively short life of the solution makes it convenient to have a dry mix available for quickly and easily preparing fresh solution as desired. A dry mix of all the ingredients is not satisfactory however due to the fact that it absorbs moisture fairly readily and becomes wet and sticky. In addition to the difficulties of handling a sticky mass, the ingredients when wet undergo deterioration and color changes.

As another phase of the invention it has been found that the dry mix may be easily stored for long periods in the form of separate portions. The diazonium compound and the couplers are kept separately in these portions, the remaining ingredients being included in either or partly in both portions.

Figure 4:
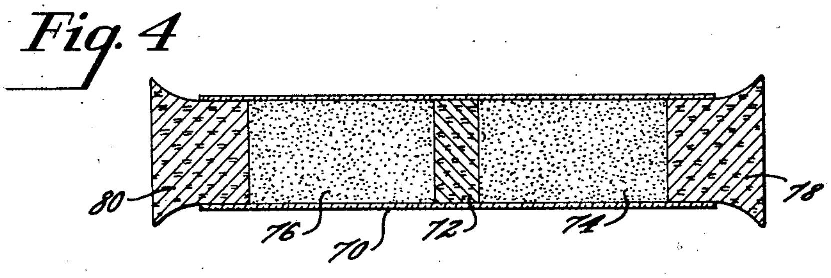
Fig. 4 is a sectional view of one type of receptacle for holding the sensitizing dry mix of the invention.

Fig. 4 shows one technique for storing such a dry mix. A receptacle 70 is arranged to provide two separated compartments. In the form shown, the receptacle 70 is tubular and has an obstruction such as a tightly fitting seal or plug 72 which divides its interior into compartments 74, 76 between which no intermingling can take place. The ends of the tube which are the compartment openings are closed with threaded caps or stopper seals 78, 80. The separate mix portions placed in the respective compartments can thus be stored indefinitely. The container 70 may be dimensioned so as to receive just enough of the mix to make a quantity of solution sufficient for a single use period. For example when using the apparatus of Fig. 1 the quantity of solution so prepared may be adequate to make one filling of trough 34.

While several exemplifications of the invention have been indicated and described above, it will be apparent to those skilled in the art that other modifications may be made without departing from the scope of the invention as set forth in the appended claims.

What is claimed is:

1. In a method of electrolytically marking a relatively moving porous record sheet member, the steps of moistening the record member with an electrically conductive solution comprising a salt of a diazotized p-amino dialkyl aniline selected from the class consisting of p-amino dimethyl aniline and p-amino diethyl aniline, an azo coupler including at least one aromatic hydroxy compound selected from the class consisting of phenols and naphthols, and buffer material, maintaining the acidity of the solution at a pH between about 4.5 and 5.5 with the aid of the action of said buffer material, and passing an electrolytic marking current through the moistened record member.

2. An electrolytic marking method as defined by claim 1 in which the solution is an aqueous solution of between about 0.01 and 0.4 mol percent of a salt of diazotized p-aminodiethylaniline, between about 0.002 and 0.2 mol percent phloroglucinol, between about 0.001 and 0.1 mol percent resorcinol, a conductivity improving electrolyte, and buffer material.

3. An electrolytic marking method as defined by claim 2 in which the buffer material is an acid salt of a strong base and a weak polybasic acid; and the salt of diazotized p-aminodiethylaniline is selected from the class consisting of the fluoborate, the double zinc halide and the double cadmium halide.

4. An electrolytic marking method as defined by claim 1 in which the diazonium compound is a double halide of diazotized p-aminodiethylaniline and zinc; the buffer material is primary sodium phosphate; phloroglucinol and resorcinol are included in the solution as coupler compounds; and a relatively neutral highly ionized electrolyte is included in the solution to improve its electrical conductivity.

5. An electrolytic marking method as defined by claim 1 in which the porous record member before moistening includes a dry coating of at least the acid-stabilized diazonium compound.

6. A sensitizing solution for electrolytic marking on porous sheets moistened with the solution, said solution comprising essentially water in which is dissolved about 0.01 to about 0.4 mol percent double halide of diazotized p-aminodiethylaniline and at least one metal selected from the class consisting of cadmium and zinc, about 0.002 to about 0.2 mol percent phloroglucinol, about 0.001 to about 0.1 mol percent resorcinol, a highly ionized electrolyte, and buffer material holding the acidity of the solution within the range from pH 4.5 to pH 5.5, the buffer being present in a concentration sufficient to keep the pH from rising above that range during at least eight hours' ageing of the solution.

7. A sensitizing solution as defined by claim 6 in which the buffer material is an acid salt of a strong base and a polybasic weak acid.

8. In a sensitizing solution for electrolytic marking: about 0.01 to 0.4 mol percent of the double chloride of zinc and diazotized p-aminodiethylaniline, about 0.002 to 0.2 mol percent phloroglucinol, about 0.001 to 0.1 mol percent resorcinol, about 1.24 mol percent sodium chloride, about 0.07 mol percent primary sodium phosphate, the balance being essentially water.

HAROLD GREY GREIG.

References Cited in the file of this patent

UNITED STATES PATENTS

| Number | Name | Date |
|---|---|---|
| 1,975,409 | Schnitzpahn | Oct. 2, 1934 |
| 2,378,305 | Lecher | June 12, 1945 |
| 2,433,632 | Solomon | Dec. 30, 1947 |
| 2,435,700 | Solomon | Feb. 10, 1948 |
| 2,442,596 | Greig | June 1, 1948 |
| 2,453,484 | Young | Nov. 9, 1948 |

FOREIGN PATENTS

| Number | Country | Date |
|---|---|---|
| 316,784 | Great Britain | Aug. 8, 1929 |

OTHER REFERENCES

Industrial and Engineering Chemistry, vol. 39, Oct. 1947, pages 1286–88.

An Introduction to Electrochemistry, by Samuel Glasstone, 1942, pages 410 and 414.